United States Patent
Walsh et al.

[11] Patent Number: 5,953,384
[45] Date of Patent: Sep. 14, 1999

[54] AUTOMATIC MEASUREMENT OF GPS CABLE DELAY TIME

[75] Inventors: William James Walsh, Chicago, Ill.; Edward Dean Berry, Chandler; Thomas Michael King, Tempe, both of Ariz.

[73] Assignee: Motorola, Inc., Schaumburg, Ill.

[21] Appl. No.: 08/869,356

[22] Filed: Jun. 5, 1997

[51] Int. Cl.[6] .................................................. H04L 7/00
[52] U.S. Cl. ........................ 375/354; 375/356; 455/51.2; 342/352
[58] Field of Search ..................................... 370/517, 519, 370/520; 455/51.2, 12.1, 13.2, 67.6; 375/354, 356, 358; 342/352; 340/825.3

[56] References Cited

U.S. PATENT DOCUMENTS

| | | | |
|---|---|---|---|
| 4,337,463 | 6/1982 | Vangen | 340/825.3 |
| 4,926,446 | 5/1990 | Grover et al. | 375/358 |
| 5,261,118 | 11/1993 | Vanderspool | 455/51.2 |
| 5,280,629 | 1/1994 | Lo Galbo | 455/51.2 |
| 5,289,459 | 2/1994 | Brownlie | 370/17 |
| 5,469,467 | 11/1995 | Vella-Coleiro | 375/358 |
| 5,483,677 | 1/1996 | Brydon et al. | 455/67.6 |
| 5,510,797 | 4/1996 | Abraham et al. | 342/352 |

*Primary Examiner*—Stephen Chin
*Assistant Examiner*—Shuwang Liu
*Attorney, Agent, or Firm*—Bradley J. Botsch

[57] ABSTRACT

A method and apparatus accurately synchronizes a communications equipment (101) to a precise 1 PPS signal (229) when the remote GPS equipment (112) and the communications equipment (101) are separated by a cable (110) of unknown length. Accordingly, integrity and precision of the 1 PPS timing signal is maintained when synchronizing the communications system.

6 Claims, 3 Drawing Sheets

AUTOMATIC MEASUREMENT OF GPS CABLE DELAY TIME

BACKGROUND OF THE INVENTION

Global Positioning System (GPS) satellites provide two time references to determine accurate time referenced to either GPS time or Universal Time Coordinated (UTC). GPS receivers process the received satellite signals to provide a precise 1 pulse-per-second (1 PPS) signal, referenced to either GPS time or UTC. Moreover, various communications equipment also require a precise 1 PPS signal, referenced to UTC for synchronization. However, when the GPS receiver is not in close proximity to the communications system to be synchronized, the use of long cables are necessary to connect the two. However, extending cables over long lengths causes the system operator to measure the cable length, as well as its corresponding delay time, and include this measurement into the overall system timing. This is typically a manual process and is prone to error of operator entry or mis-measurement of cable length. Further, it also adds to the overall installation time, thereby resulting in a higher installation cost.

Referring to U.S. Pat. No. 4,827,437 and U.S. Pat. No. 4,814,689, techniques for measuring cable delay time are disclosed. However, neither of these patents discuss or suggest the use of the PPS of a GPS receiver to accurately synchronize remote equipment.

DETAILED DESCRIPTION OF THE DRAWINGS

The use of a GPS receiver is a useful technique for accomplishing time synchronization of various types of communication systems, such as cellular base stations, paging base stations, network infrastructure and other equipment requiring precise time. This is primarily accomplished by making use of the 1 pulse per second (1 PPS) signal that is inherent in the GPS receiver. However, in order to maintain precise synchronization, if the GPS receiver that is providing the 1 PPS synchronization/timing signal to the communication system is not in close proximity thereto, then the time delay induced by the cable, RF link or fiber link between the two must be accurately known. Accordingly, the present invention provides a method and apparatus for accurately synchronizing the communication equipment to the 1 PPS signal when the GPS receiver and the communication equipment are separated by an unknown length of cable.

Figure 1:
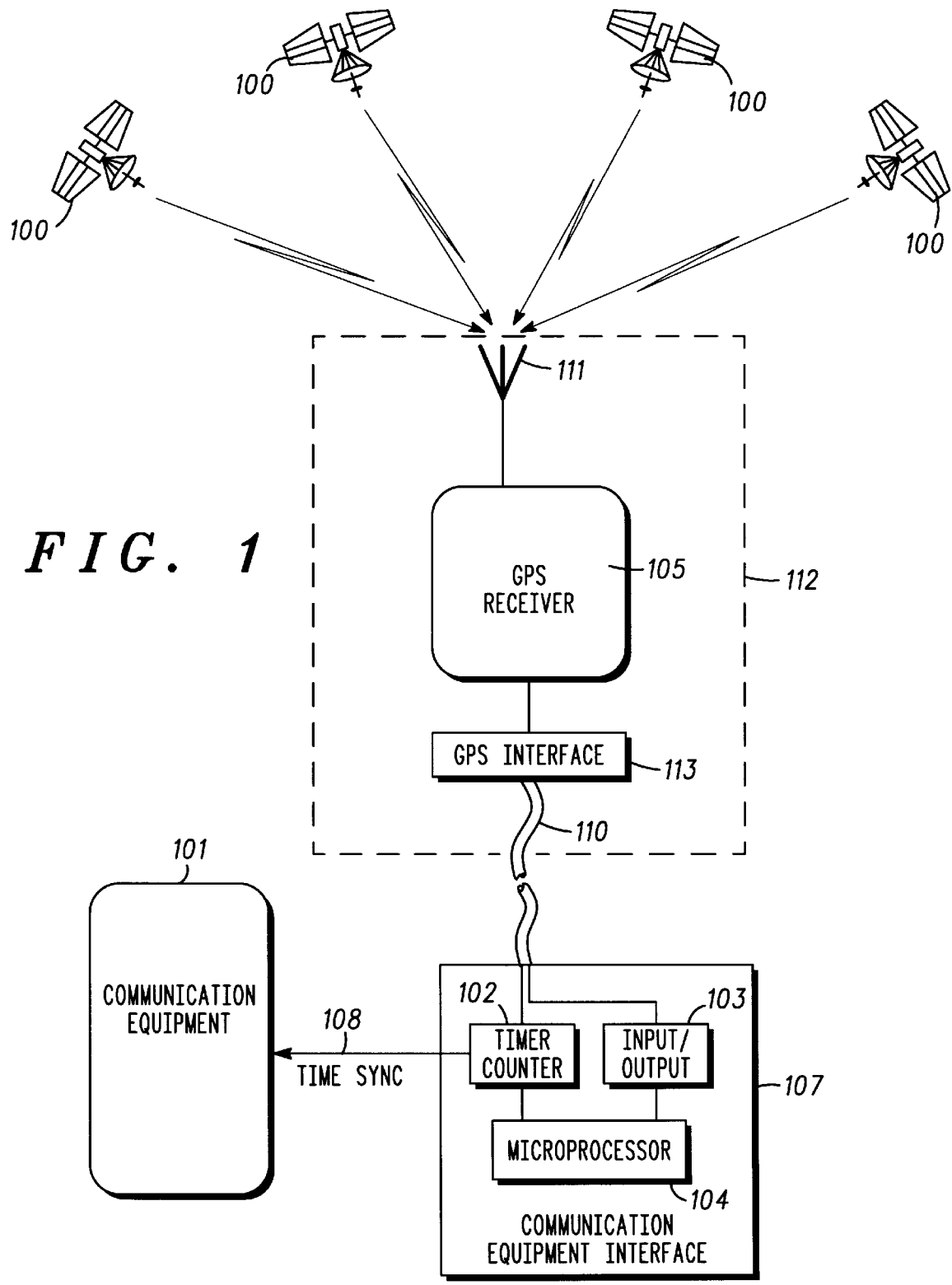
FIG. 1 is a detailed block diagram illustrating how a remote GPS receiver may be used to accurately synchronize a communications system to GPS precise time when the remote GPS receiver and the communications system are connected by an undetermined length of cable.

Referring to FIG. 1, a block diagram illustrating how a remote GPS receiver may be used to synchronize a communications system to GPS precise time, i.e., accurate to the nanosecond level, when the remote GPS receiver and the communications system are connected by an undetermined length of cable. FIG. 1 illustrates GPS satellites 100 which generates signals that are received by remote GPS equipment 112 which includes GPS antenna 111 and GPS receiver 105. GPS receiver 105 processes these received GPS signals and, among other things, provides a 1 pulse per second (1 PPS) timing signal to GPS interface 113. The 1 PPS signal is supplied to communications equipment interface 107 via cable 110 whereby cable 110 has an unknown delay time associated therewith. Communications equipment interface 107, in turn, provides a time synchronization signal 108 to communications equipment 101. Typically, cable 110 couples GPS equipment 112 to communications equipment 101 whereby GPS interface 113 couples to a first end of cable 110 and provides an interface to GPS receiver 105 while communications equipment interface 107 couples to a second end of cable 110 and provides an interface to communications equipment 101.

However, due to cable 110, there is a separation of some undefined/unknown distance which may be from a few feet to a few thousand feet, between communications equipment 101 and remote GPS receiver 105. Accordingly, the present invention provides a method and apparatus to measure signal propagation delay time that is required to compensate for the cable delay time and maintain optimum accuracy control of the 1 PPS timing signal that is transferred from remote GPS receiver 105 to the communications system.

In accordance with the present invention, communications equipment interface 107 and GPS interface 113 are used to measure the delay time due to the equipment being physically separated via cable 110. Communications equipment interface 107 includes timer counter 102, input/output block 103 and microprocessors 104 which are combined to measure the delay, provide for cable delay time compensation to GPS receiver 105 and to ensure the time synchronized pulse (1 PPS) is accurately sent to the communications equipment 101 to allow for precise synchronization. It is understood that communications equipment 101 may take the form, for example, of a land line network equipment, cellular infrastructure equipment, paging infrastructure equipment, radio infrastructure equipment or any electronic equipment requiring time synchronization.

Figure 2:
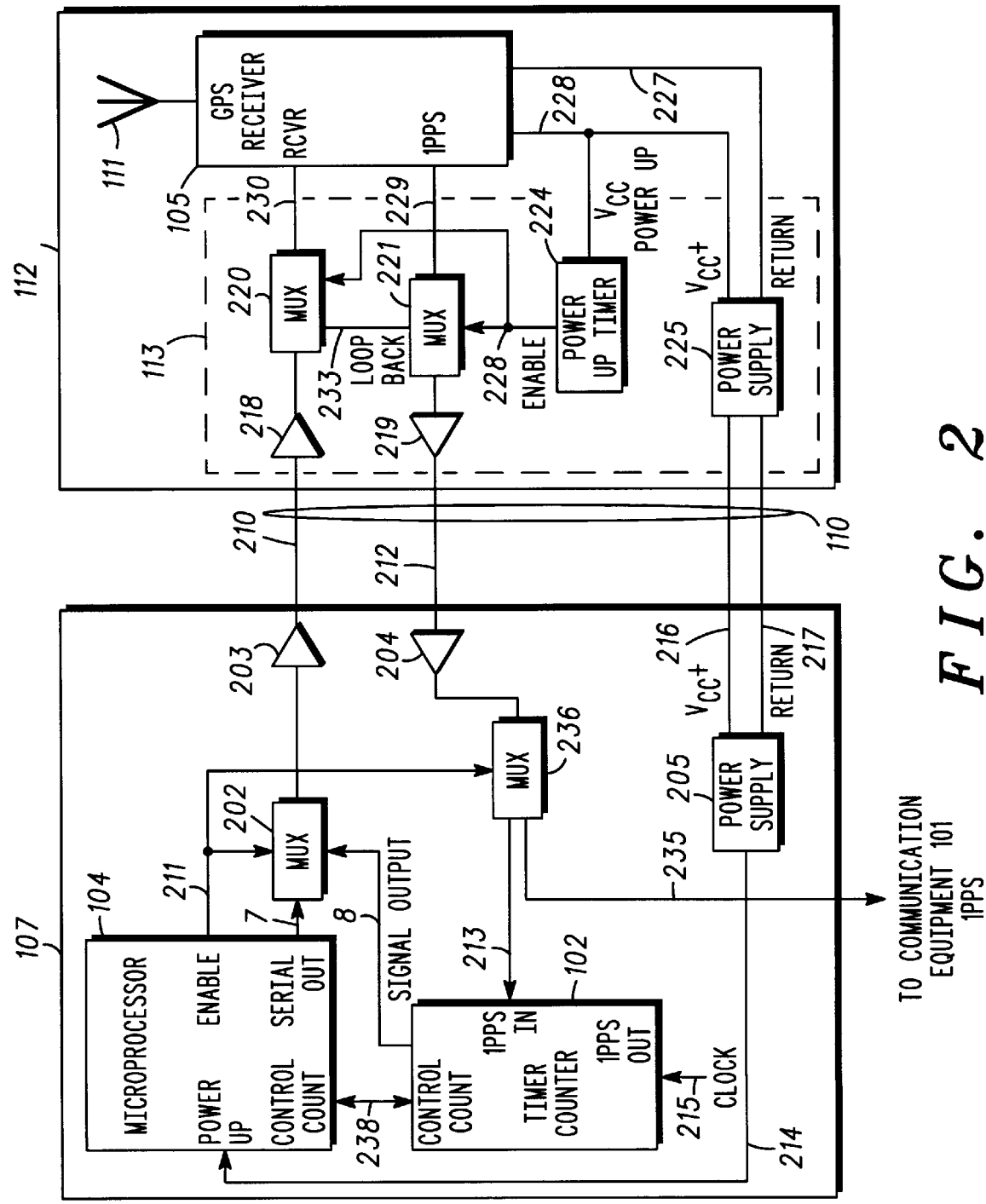
FIG. 2 is a detailed block diagram illustrating the components of a communications equipment interface and a remote GPS receiver for accurately synchronizing the communications system to GPS precise time in accordance with the present invention.

Referring now to FIG. 2, a more detailed block diagram of the components of communications equipment interface 107, which includes microprocessor 104 and timer counter 102, and remote GPS equipment 112, which includes GPS receiver 105, antenna 111 and GPS interface 113 for accurately synchronizing the communications equipment 101 to GPS precise time is shown. It is understood that components shown in FIG. 2 that are identical to components shown in FIG. 1 are identified by the same reference numbers.

Briefly, interface 107 initiates a cable delay measurement process by appropriately selecting MUX 202 to provide a timing signal from timer counter 102 to interface 113 while interface 113 is appropriately set, via power up timer 224, to provide a return path, via MUXES 220 and 221, of the timing signal so that the delay time may be determined. Thereafter, interface 113 allows the GPS 1 PPS signal to be sent to interface 107 while microprocessor 104 maintains an accurate measurement of the delay cable time. After the measurement cycle is complete, the cable delay time may be sent to the GPS receiver 105 through serial line 7 to allow for GPS receiver 105 to compensate the 1 PPS signal or it may be made available at the application level to provide an additional means of compensation. Either of these alternatives provides a method to preserve the integrity and precision of the 1 PPS signal when applied to communications equipment 101.

The communications equipment interface 107 is coupled to GPS interface 113 of remote GPS equipment 112 via a transmit path 210 and a receive path 212 (of cable 110) for allowing the transmission of the timing signal from the communications equipment interface 107 to the remote GPS equipment 112 and then the return of the same signal back to the communication equipment 107.

Power is provided to the two blocks via power supply 205 which provides power to both communications equipment interface 107 via power line 214 and to remote GPS equipment 112 via power line 216 and return line 217. Upon power application or some predetermined sequence, the communications equipment interface 107, via the power up line 214, initiates the microprocessor 104 which in turn initializes the timer counter 102 through input/output path 238 and enables MUXES 202 and 236 through the enable line 211 to turn off the serial interface output signal 7 of microprocessor 104 and the 1 PPS signal to communications equipment 101. This disables the communications output port and enables the timing signal 8 to be transmitted from the timer counter block 102 and through MUX 202.

Additionally, the GPS interface 113 of remote GPS equipment 112 is also performing a power-up condition to allow for the loop back of the timing signal. This is accomplished by the power-up signal line 216 and return signal line 217 which supplies voltage to the remote GPS power supply block 225, which, in turn, provides the power for all circuitry within remote GPS equipment 112. In particular, power supply line 228 is used to initialize the power-up timer 224 thereby starting a predetermined count to allow for the timing signal 8 to be returned back to communications equipment interface 107. In particular, power-up timer 224 enables MUX 220 and 221 through enable line 228 for the duration of the cable measurement to allow for the loopback and return of the timing signal. This essentially inhibits the 1 PPS signal from GPS receiver 105 from being sent to interface 107 until accurate timing information is ascertained. Further, timing signal 8 may be sent several times to GPS equipment 112 to perform averaging by appropriately setting the duration of power-up timer 224.

Referring back to communications equipment interface 107, a clock signal 215 is input to the timer counter 102 to allow for counting the two-way propagation time of the timing signal 8. The clock frequency is established to allow for optimum measurement accuracy and resolution of the time measurement to recover the delay through the system. The delay time measured is the complete transit time from timer counter 102, through MUX 202, through transmitter 203, through communication path 210, into receiver 218, through MUX 220, through loop back path 233, through MUX 221, through transmitter 219, through communication path 212, into receiver 204, through MUX 236 and returned to through signal line 213 to stop the counter of timer counter 102.

The timer count is then sent, via signal line 238 to microprocessor 104 where it is then processed into the delay measurement. The count provided from timer counter 102 to microprocessor 104 includes the number of clock cycles representing the total timing signal transmit time from communications equipment interface 107 to remote GPS equipment 112 and back to communications interface 107. Accordingly, this is a two-way time and must be divided by two to determine the propagation time for the 1 pulse per second timing signal from GPS equipment 112 to communications equipment interface 107. Therefore, the time delay (Time Delay) may be computed as shown in equation 1.

$$\text{Time Delay} = (\tfrac{1}{2}) \times (\text{Count}) \times (\text{Period of Clock}) \qquad \text{EQN. 1}$$

where Count is the stopped count value of timer counter 102; and Period of Clock is the period of clock 215 supplied to timer counter 102.

It is understood that several timing signals may be sent from interface 107 to interface 113 whereby these times may be averaged to obtain a more accurate estimate of the time delay therebetween.

Once an accurate time delay between the two pieces of equipment have been obtained and the power-up timer 224 has timed out, the 1 pulse per second signal 229 from GPS receiver 105 may be enabled and sent from remote GPS equipment 112 via the path MUX 221, transmitter 219, through cable line 212 to receiver 204, and to MUX 236, whereby the 1 pulse per second signal may be provided as an output through signal line 235. The 1 pulse per second signal is generated as a result of receiving the GPS signals from the satellite via antenna 111 followed by processing of the received satellite signals GPS receiver 105. Accordingly, since an accurate time delay between this unknown time delay induced by cable 110 has been ascertained and applied to the 1 PPS signal, by either the application or the GPS receiver 105, the receipt of the 1 PPS signal remains an accurate timing signal for synchronization of equipment 101.

Figure 3:
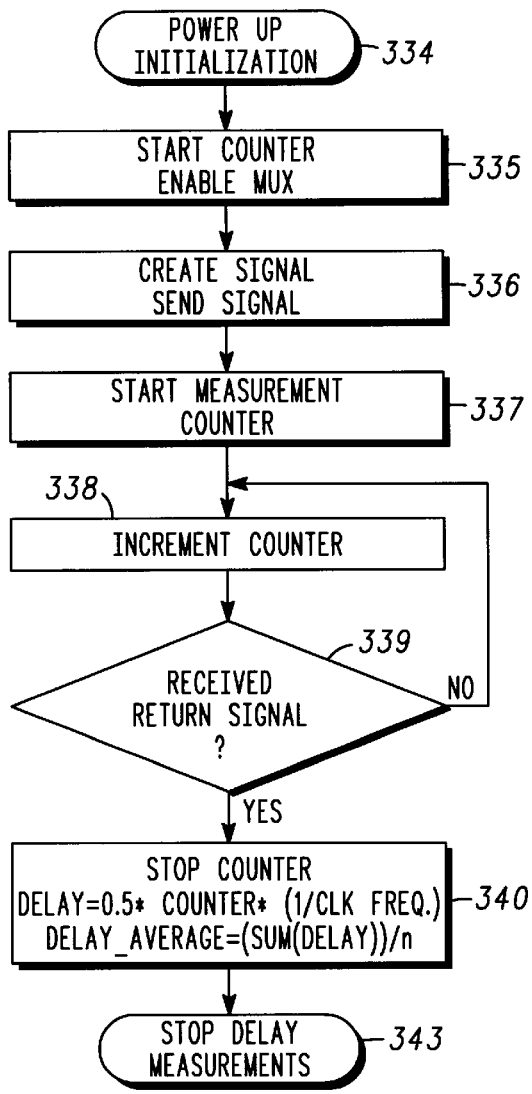
FIG. 3 is a flow chart illustrating the steps performed within a communications equipment interface for accurately synchronizing the communications system to GPS precise time in accordance with the present invention.

Referring to FIG. 3 a detailed flowchart illustrating the steps performed within communication equipment interface 107 for accurately synchronizing the communications system 101 to GPS precise time is shown. First, power-up initialization (334) is performed whereby all internal registers are initialized followed by the starting the measurement timer counter 102, via signal 8, while also enabling the MUX 202 as illustrated by box 335. This essentially enables the delay measurement mode of operation.

Next, the timing signal is created (336) from the reference clock 215. Sending this timing signal to the remote GPS equipment starts a measurement counter (337) as timed by the system clock period. Each period of the clock increments the counter, as represented by step 338.

The system constantly checks to see if the timing signal has returned (339) whereby if the signal has not returned, the counter continues increment at the rate of the clock.

If the return signal has been received by the counter, the counter is stopped and the count is sent to the microprocessor where it is divided by two and scaled to the clock rate to compute the time delay, as represented by box 340. Further, if multiple measurements have been taken, the average delay is correspondingly computed.

Once the delay measurement is stopped, the equipment returns to the normal mode of operation where the 1 PPS is output.

Figure 4:
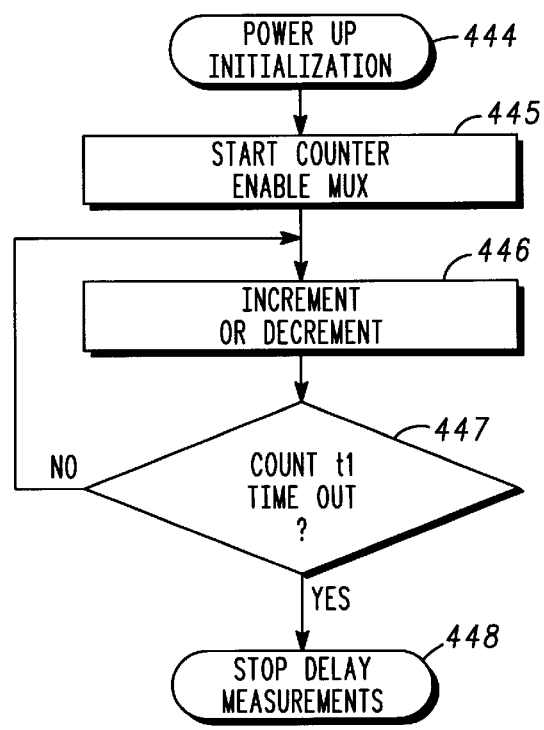
FIG. 4 is a flow chart illustrating the steps performed within the remote GPS receiver for accurately synchronizing the communications system to GPS precise time in accordance with the present invention.

Referring now to FIG. 4. a detailed flowchart illustrating the steps performed within remote GPS equipment 112 for accurately synchronizing the communications system to GPS precise time is shown. First, a power-up initialization is performed as illustrated by box 444. After power-up, a power up timer 224 counter is started and MUXES 220 and 221 are enabled to allow for the wrap around of the timing, as illustrated by box 445.

The power-up timer 224, which also functions as a counter, is incremented or decrement (446) dependent upon the hardware implementation. If the timer has not timed out (447), the increment or decrement function is applied and the counter continues until timed out.

After timing out, the delay measurement is stopped, as represented by box 448, and the remote GPS equipment returns to the normal state, GPS receiver commands, which include cable delay compensation, and the precise 1 PPS signal are sent to communications interface equipment 107 for use in accurately synchronizing equipment 101.

By now it should be apparent that a novel method and apparatus has been provided for accurately synchronizing a communications equipment to a precise 1 PPS signal when the GPS receiver and the communications equipment are separated by an unknown length via a cable, RF or fiber link. Accordingly, integrity and precision of the 1 PPS timing signal is maintained when synchronizing the communications system.

It is to be understood that the phraseology or terminology employed herein is for the purpose of description and not delimitation. Accordingly, the invention is intended to embrace all such alternatives, modifications, equivalents and variations as fall within the spirit and broad scope of the appended claims.

We claim:

1. An apparatus for synchronizing electronic equipment to a 1 pulse per second (PPS) signal from a remote Global Positioning System (GPS) receiver, said electronic equipment and said GPS receiver are separated by a finite distance, the apparatus comprising:

a cable of a length of said finite distance:

a first interface coupled between said electronic equipment and a first end of said cable, a second interface coupled between said GPS receiver and a second end of said cable, said second interface including a multiplexer for alternately returning an incoming signal from said first interface, said cable or for providing said 1 PPS signal to said first interface; and said first interface equipment including a timer for generating a timing signal and for measuring a delay of said timing signal traveling to said second interface, through said cable, said first interface and back to said timer of said first interface equipment, said timer further receiving said 1 PPS signal from said GPS receiver when said multiplexer of said second interface selects said 1 PPS signal whereby said 1 PPS signal is provided to said electronic equipment for synchronization and whereby said delay is utilized to maintain precision of said 1 PPS signal.

2. The apparatus of claim 1 wherein said second interface includes an additional timer for determining a time that said return path is active.

3. The apparatus of claim 1 wherein said first interface includes a microprocessor for determining a time delay of signals transferred between said first and second interfaces based upon a count of said timer.

4. A method for synchronizing electronic equipment to a 1 pulse per second (PPS) signal from a remote Global Positioning System, (GPS) equipment, said electronic equipment and said GPS equipment are separated by a finite distance and connected by a cable, said electronic equipment including an electronic equipment interface coupled between said electronic equipment and a first end of said cable, said GPS equipment including a GPS interface coupled between a GPS receiver and a second end of said cable, the method comprising the steps of:

sending a timing signal from said electronic equipment interface through said finite distance of said cable to said GPS interface;

activating a return path in said GPS interface such that said timing signal may be returned back to said electronic equipment interface which sent said timing signal via said cable;

determining by said electronic equipment interface a time delay of signals transferred between said GPS interface, said electronic equipment interface and said cable;

inactivating said return path after a predetermined time period;

receiving a GPS 1 PPS signal from said GPS receiver;

transferring said 1 PPS signal from said GPS interface to said electronic equipment interface via said cable; and providing said 1 PPS signal to said electronic equipment whereby said time delay of said 1 PPS signal through said cable is considered thereby maintaining precision of said 1 PPS signal.

5. The method of claim 4 further including the step of starting a first timer upon sending said timing signal.

6. The method of claim 4 further including the step of starting a second timer to determine a time duration that said return path is activated.

* * * * *